Patented Dec. 19, 1939

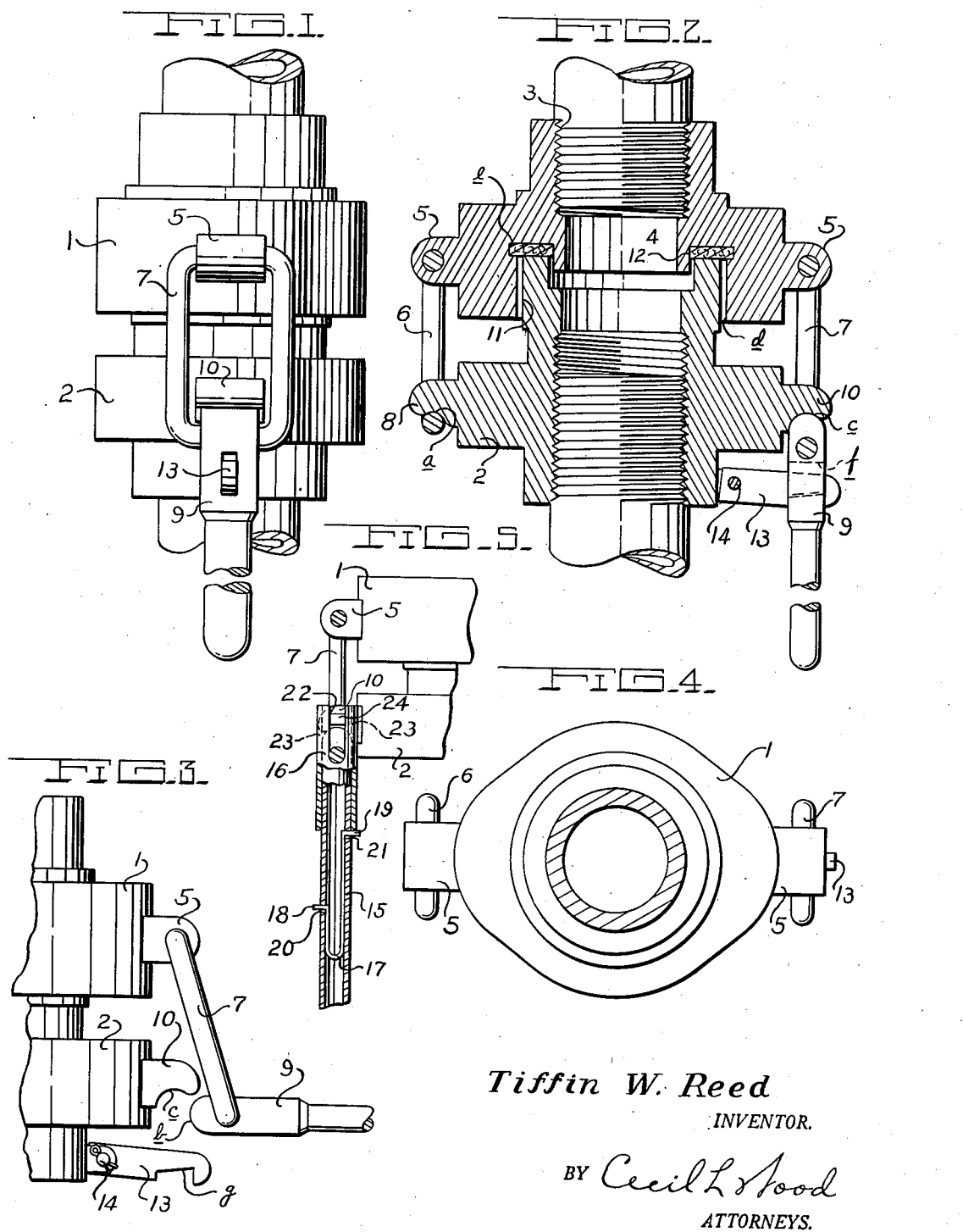

2,183,895

UNITED STATES PATENT OFFICE 2,183,895

COUPLING

Tiffin W. Reed, Fort Worth, Tex., assignor of one-half to E. H. Harrison, Fort Worth, Tex.

Application November 9, 1937, Serial No. 173,718

1 Claim. (Cl. 285—172)

This invention relates to unions and couplings of the type usually employed in the connecting of threaded pipes wherein the two ends of pipe having conventional right hand threads are necessarily joined by means of a device other than conventional couplings or collars and its principal object resides in the provision of means whereby the joining of two threaded pipes can be made quickly and securely without the use of the usual threads found in conventional type unions by connecting the two members of the union with links, which are hingedly attached to one of the members and hooked or latched to the other member, tension between the two members being applied by a lever.

Another object of the invention resides in the provision of a device of this character which is simple in construction, yet expeditious and efficient in operation.

Broadly, the invention seeks to provide, in a device of the character described, a means of coupling a union without the use of threads except for the permanent connections of the two members by the use of links and having the necessary tension applied by the use of a lever attached thereto.

In certain uses, such as the connections to refrigerator cars, oil tank cars, gasoline trucks, and the like, where flexible hose is connected to a permanent connection, it has been found that the frequent threading and unthreading of the conventional type union is inconvenient and requires considerable time in making and breaking connections. Further, the conventional union is frequently ruined by the misthreading in joining the conduits, whereas the improvements of this invention would avoid these difficulties and make for the quick and sure operation of a union joint.

The invention will be more readily understood taken in connection with the appended drawing wherein:

Figure 1 is an elevational view illustrating a type of link used in this invention.

Figure 2 is a vertical sectional view of the invention illustrating the relative positions of the various parts as well as the latch arrangement.

Figure 3 is a fragmentary elevational view illustrating the lever and the link, to which it is joined, disengaged.

Figure 4 is a plan view of the invention, and

Figure 5 illustrates a modification of the latch.

Accordingly, therefore, the invention is comprised primarily of a female member 1 and a male member 2, the said member 1 having a threaded connection 3 at the outer end of the conduit 4. Arranged on opposite exterior sides of the member 1 are integral lugs 5 through which links 6 and 7 are laterally journaled, the link 6 being the shorter and engaging a lug 8 which is integral with the member 2, the said link being seated in the recess a. The link 7 has journaled on its lower end a lever 9 of the first class, of which the end b engages the recess c of the lug 10 that is integral with the member 2 and opposite the lug 8 previously referred to.

A guide is provided in the form of a spigot 11 which is integral with the member 2 and engages the mouth d of the member 1, the end of which engages a washer 12 retained within the upper member by reason of its engagement in the recess e.

A slot f is provided in the handle 9 arranged so as to engage a latch 13 which is mounted on the member 2 by an arrangement of lugs and a pin 14, particularly illustrated in Figure 3.

A modification of the latch arrangement, as shown in Figure 5, is attained in the provision of a tubular handle 15 which has a sleeve 16 freely slidable thereon. A spring 17, shaped substantially like a hairpin, is provided within the said handle and is retained in place by the projections 18 and 19 passing through the small apertures 20 and 21. One of the projections 18 is lower than the other projection 19 for the purpose of retaining the sleeve 16 on the handle when not in engagement. Slots 22 are provided on each side of the sleeve 16 to engage the link on either of its sides. Other slots are arranged at right angles to the previously mentioned slots 22 to accommodate the passage of the sleeve 16 over the lug 10. A projection 24 is provided integral with the lug 10 and serves as a guide for the first mentioned slot 22. When in engagement the projection 19 of the spring 17 holds the sleeve 16 in place around the lug 10 and, by reason of the engagement of the slot 22 with the lug 24, the latch assembly is secured in place. In order to release the latch it is only necessary to depress the projection 19 within the tubular handle 15 and allow the sleeve 16 to slide downwardly until stopped by the projection 18 of the spring 17.

In operation, it is preferred that the permanent connection be the female member 1 and is arranged above the male member 2 thus allowing the links 6 and 7 and the handle 9 to be suspended. To make the connection the lug 8 is inserted within the lower end of the latch 6 and seated in the recess a, the spigot 11 is then pivotally inserted within the mouth $d$ of the upper member 1. The end $b$ of the handle 9 is then positioned within the recess $c$ of the lug 10 by raising the said handle in a position lateral with respect to the union assembly, as particularly demonstrated in Figure 3, the said handle then being urged to a position parallel with respect to the axis of the union and thereby causing the spigot 11 to be firmly pressed against the washer 12. In the downward movement of the handle 9 the slot $f$ passes over the outermost end of the latch 13 allowing the niche $g$ to fall against the lowermost part of the said slot thus securing the said handle in a rigid position.

Although the invention has been described with great particularity, it is obvious that certain changes and modifications may be resorted to from time to time by those skilled in the art and such changes and modifications as may be considered in the spirit and intent of the invention may be also considered within the scope of the appended claim.

What is claimed is:

A union connection comprising in combination, male and female members and a conduit longitudinally therethrough, links pivotally connected to one of the said members, lugs on the other of the said members, recesses in the said lugs opposite the said pivoted connections for engaging either of the said links, a lever pivotally connected to the other of the said links opposite its pivoted connection with the first named member, a projecting end forming part of the said lever for engaging the recess of the other of the said lugs, a hairpin spring within the said handle, outward projections formed at the ends of the said hairpin spring at unequal distances with respect to ends of the said lever, a sleeve over the said handle, openings in the end of the said sleeve adapted to engage either of the said recessed lugs and the link attached to the said lever, a means selectively allowing the said sleeve to pass over the spring projection nearest the said pivotal connection of the lever.

TIFFIN W. REED.